No. 641,612. Patented Jan. 16, 1900.
G. L. SMITH & A. HUFFMAN.
CREAM SEPARATOR.
(Application filed Apr. 19, 1899.)
(No Model.) 2 Sheets—Sheet 1.
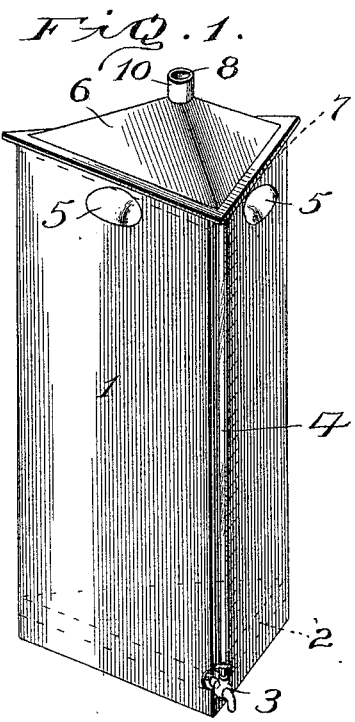
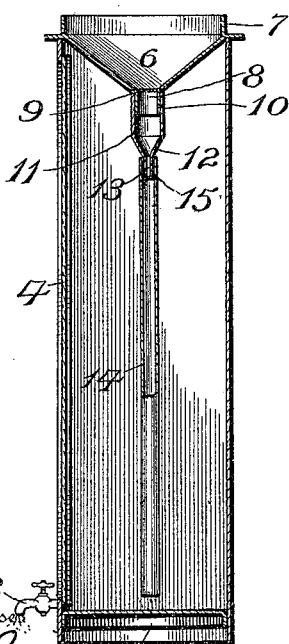
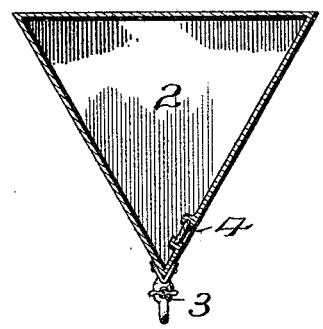
Inventors
George L. Smith
Austin Huffman No. 641,612. Patented Jan. 16, 1900.
G. L. SMITH & A. HUFFMAN.
CREAM SEPARATOR.
(Application filed Apr. 19, 1899.)
(No Model.) 2 Sheets—Sheet 2.
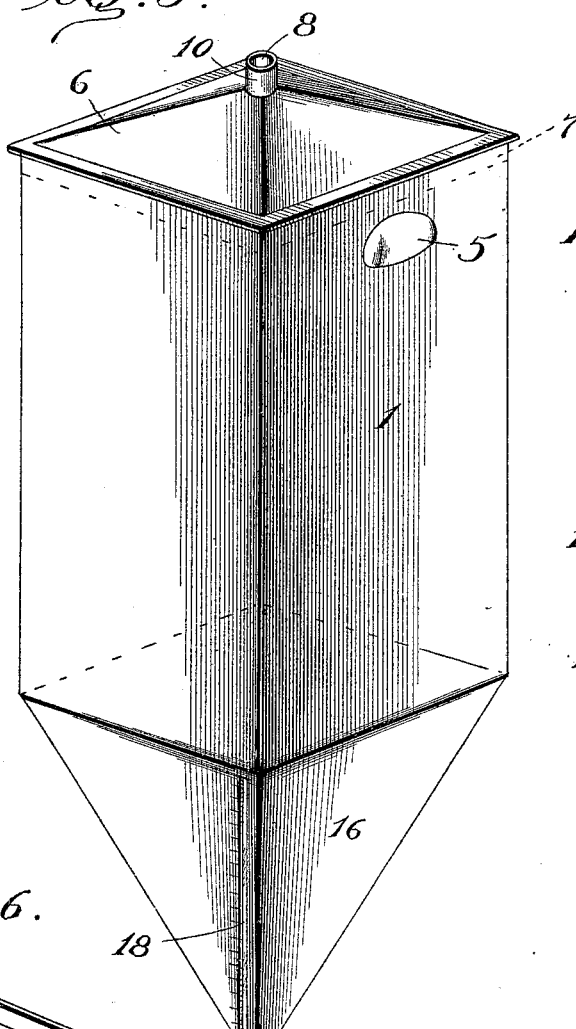
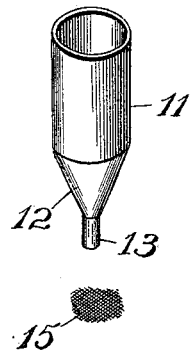
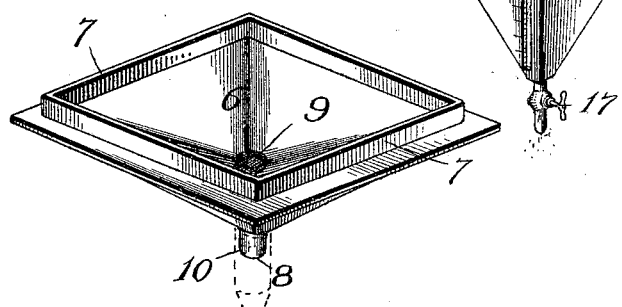

UNITED STATES PATENT OFFICE.

GEORGE L. SMITH AND AUSTIN HUFFMAN, OF PRINCETON, ILLINOIS.

CREAM-SEPARATOR.

SPECIFICATION forming part of Letters Patent No. 641,612, dated January 16, 1900.

Application filed April 19, 1899. Serial No. 713,678. (No model.)

*To all whom it may concern:*

Be it known that we, GEORGE L. SMITH and AUSTIN HUFFMAN, citizens of the United States, residing at Princeton, in the county of Bureau and State of Illinois, have invented certain new and useful Improvements in Cream-Separators; and we do hereby declare the following to be a full, clear, and exact description of the invention, such as will enable others skilled in the art to which it appertains to make and use the same.

This invention relates to apparatus for separating the cream from milk by gravitative action in a comparatively small space of time and with little or no disturbance of the fatty globules, such as would tend to break up and disintegrate them, as is the case where violent agitation is resorted to in the process of separation.

The object of the invention is to acquire a maximum amount of cream in the shortest time possible and without breaking the encysted fatty particles, whereby the butter when churned has a firm and fine texture and a rich color and is superior to butter produced from cream separated by violent agitation.

The improvement consists of the novel features, details of construction, and combinations of parts which hereinafter will be more particularly specified, claimed, and shown in the accompanying drawings, in which—

Figure 1 is a perspective view of a separator for attaining the objects of this invention. Fig. 2 is a vertical central section thereof, showing it arranged for carrying the invention into effective operation. Fig. 3 is a horizontal section. Fig. 4 is a detail view of the induction-tube and strainer. Fig. 5 is a perspective view of a different form of vessel. Fig. 6 is a detail perspective view of the cover inverted.

Corresponding and like parts are referred to in the following description and indicated in all the views of the drawings by the same reference characters.

The vessel 1, essential to the attainment of the ends in view, may be of any size and shape; but the best results are accomplished by having the vessel of angular form in plan section, as the whirling and eddying action of the milk and cream is practically obviated when drawing off the mixture of milk and water after the separation of the cream has taken place. The form shown in Figs. 1, 2, and 3 is of triangular outline, whereas that shown in Fig. 5 is square or rectangular. The vessel is open at its upper end and is closed at its lower end by an elevated bottom 2, which is in a plane parallel with the lower edges of the inclosing sides. A faucet 3 is located at the angle formed by the intersection of adjacent sides and is about in the plane of the bottom, so as to completely drain off the mixture of milk and water in the operation of the apparatus. A cream-gage 4 of ordinary construction is provided at one side of the vessel to enable the depth of the cream and the line of demarcation to be determined at any time. Handles 5 are applied to the sides of the vessel for convenience of lifting and moving the device from one place to another.

The cover for closing the upper open end of the vessel is of corresponding outline and is raised at a central point and comprises a cap 6 and a pendent rim 7, the latter being adapted to enter the upper portion of the vessel. An opening 8 is located centrally of the cap or cover and is protected by wire-gauze 9, forming a strainer. A collar 10 surrounds the opening 8 and projects upwardly from the top side of the cover and is adapted to receive the strainer and induction-tube when the apparatus is arranged for service.

A short tube 11, having its lower end portion tapering, as shown at 12, and terminating in a nozzle 13, makes connection with an induction-tube 14 and has a strainer-cloth 15 fitted to its lower end and held in place by the end of the induction-tube fitted to the nozzle 13. This tube 11, with the strainer-cloth 15, constitutes a strainer auxiliary in action to the strainer 9, applied to the opening 8 of the cover. The enlarged end of the tube 11 is fitted to the cover 10 by a slip-joint. The induction-tube 14 is of uniform diameter throughout its length and is of comparatively small bore, so as to admit the milk and water slowly in the vessel.

In the practical operation of the invention the cover is removed from the vessel and the strainer and induction-tubes fitted to the collar thereof, after which the cover is placed upon the vessel in an inverse position and serves as a funnel to receive the milk and water and direct the same into the combined tube by reason of the depressed construction of the cover and the upwardly-projecting rim thereof, as shown most clearly in Fig. 2. The combined length of the tubes 11 and 14 is such that the lower end of the induction-tube reaches to within a very short distance of the bottom 2 of the vessel. The new milk while still warm is admitted into the vessel 1 and is simultaneously strained by the parts 9 and 15. When the vessel is about half filled, cold water is slowly admitted therein by means of the induction-tube 14, and rising gradually commingles with the warm milk and effects a rapid separation of the cream, which rises and collects upon the top of the admixture of water and milk. After the separation of the cream has been effected, which can be determined by reference to the gage 4, the faucet 3 is opened and the mixture of water and milk drawn off. The cream is subsequently drawn off into another receptacle, which replaces that previously positioned for receiving the milk and water.

The vessel shown in Fig. 5 has its lower portion made tapering and is composed of triangular-shaped walls 16, which are joined at their edges and converge, forming an inverse parameter-shaped figure, the apex of which has a faucet 17 fitted thereto for drawing off the required contents of the vessel in the manner herein stated. A gage 18 of ordinary construction is applied to one of the walls 16 and is for the same purpose as the gage 4, applied to a side of the vessel, as illustrated and described in connection with Fig. 1. The manner of using this form of apparatus is precisely the same as that previously described.

Having thus described the invention, what is claimed as new is—

A cream-separator comprising an angular vessel, having an inclined bottom and a valve-controlled outlet at the lowest portion of the said bottom and provided with a sight-gage, a reversible cover for closing the upper end of the vessel, comprising a horizontal portion to rest upon the top edge of the vessel in either position of the cover, a pendent rim to enter the vessel and a central raised portion provided at a middle point with an opening over which extends a strainer material, and said cover having a collar extending therefrom in line with the protected opening, a short tube adapted to be fitted at one end by a slip-joint to the collar and having its opposite end portion tapering and terminating in a nozzle, a strainer-cloth fitted over the said nozzle, and an induction-tube fitted to the nozzle and confining the strainer-cloth thereon, substantially as described.

In testimony whereof we affix our signatures in presence of two witnesses.

GEORGE L. SMITH. [L. S.]
AUSTIN HUFFMAN. [L. S.]

Witnesses:
W. J. McELROY,
JOSEPH LANGTREE.